March 20, 1956 R. D. HUDSON, JR 2,738,701
MEANS FOR TESTING EYES
Filed Nov. 20, 1951 3 Sheets-Sheet 1

INVENTOR
RICHARD D. HUDSON JR.
BY
ATTORNEY

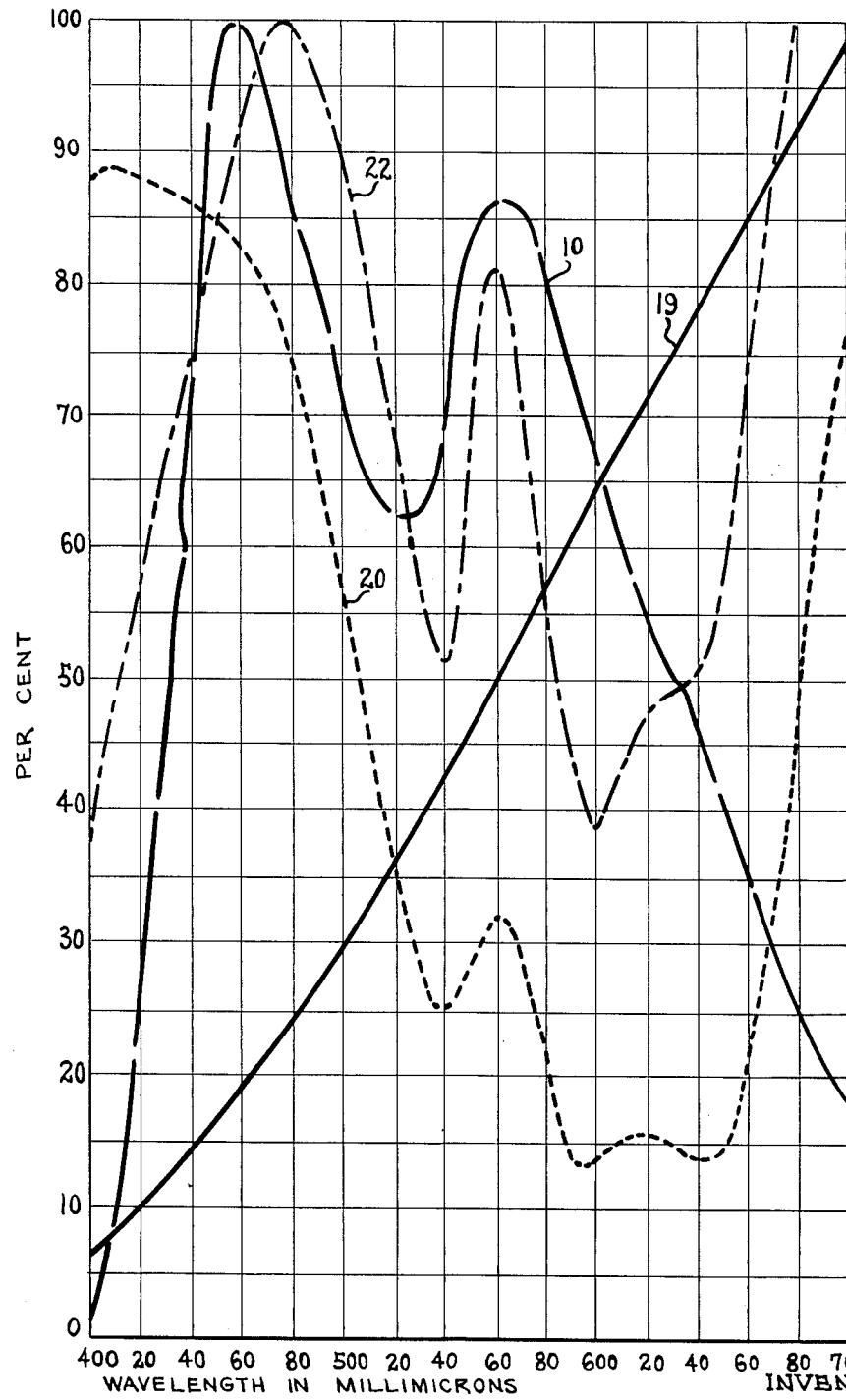

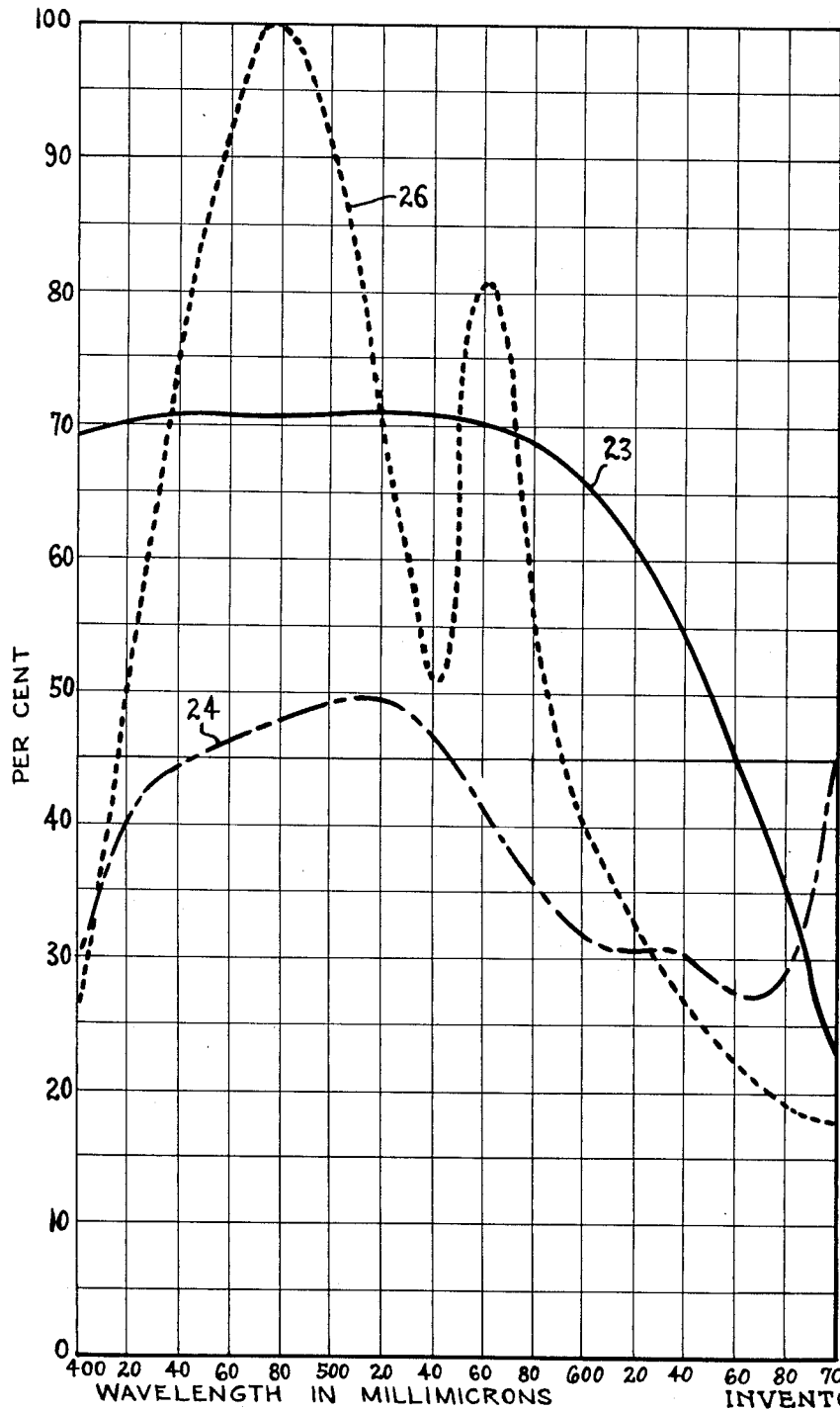

United States Patent Office 2,738,701
Patented Mar. 20, 1956

2,738,701

MEANS FOR TESTING EYES

Richard D. Hudson, Jr., Noroton, Conn., assignor to American Optical Company, Southbridge, Mass., a voluntary association of Massachusetts Application November 20, 1951, Serial No. 257,209

2 Claims. (Cl. 88—20)

This invention relates to eye testing devices and has particular reference to the provision of novel means of testing the eyes under lighting conditions simulating those encountered when viewing television.

The invention is directed to the prescribing of corrective glasses for viewing television, and has as its primary object the provision of novel means of testing the eyes wherein the light rays utilized during said testing will have a spectral distribution in the visible portion of the spectrum simulating that of the light rays from the screen of a cathode ray tube of a television receiver.

Another object is to provide an arrangement of the above character wherein the intensity of the illumination will be at a level which is practical for such eye testing.

Another object is to provide eye testing means of the above character which embodies a projector and a screen for receiving projected test characters wherein the light rays projected onto the screen and the absorptive characteristics of said screen are respectively controlled in such manner as to cause the resultant light as seen by a patient viewing said screen to have a visible spectral distribution simulating that of the light emitted by a cathode ray tube.

Other objects and advantages of the invention will become apparent from the following description taken in connection with the accompanying drawings, in which:

Figs. 2 and 3 are graphs illustrating various spectral emission, transmission and reflection curves pertaining to the invention.

Figure 1:
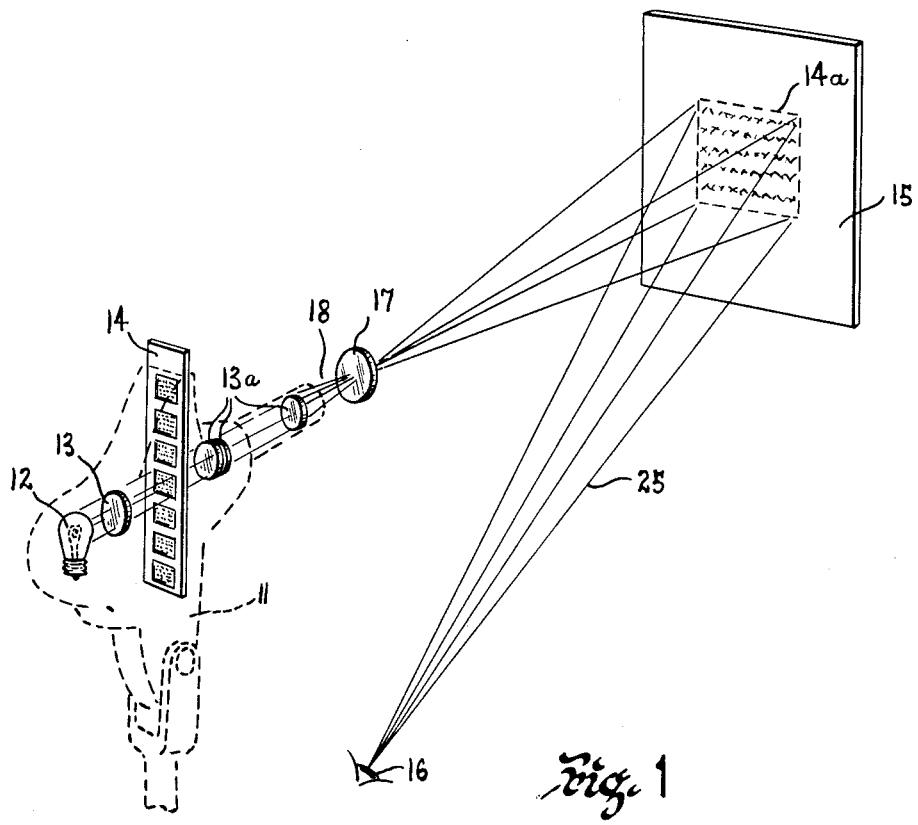
Fig. 1 illustrates schematically the method of projecting light from an incandescent lamp, through a lens system, through means for producing test characters, and through a filter onto a test screen to be viewed by the eyes of an individual under test.

It is known that a television receiver embodies a cathode ray tube having a screen formed of uniformly disposed particles of fluorescent material adapted to fluoresce upon bombardment by an electron beam to form an image which is viewed through the transparent face portion of the tube.

One of the screens most commonly used in cathode ray tubes of television receivers is the one designated as the "P4" by the Radio Manufacturers Association. The P4 produces a light of a color temperature about 7000° K. and having an emission curve in the visible spectrum as indicated by numeral 10 in Fig. 2. It will be noted that the curve 10 discloses a sharp rise in emission from about 1% at 400 mu. to about 90% at 445 mu. indicating considerable emission in the blue region of the spectrum. Emission drops to about 62% at 525 mu. but rises again to about 87% at 560 mu. indicating another peak in the yellow-green region of the spectrum. The curve drops steadily and consistently to about 10% emission of red at 720° mu.

In prescribing eyeglasses for wear by an individual when viewing television it is desirable that the eyes be tested under conditions similar to the use to which they are to be put. Therefore, it is essential for practical testing and prescribing that the individual's eyes be examined with a light simulating that of the visible emission of the cathode ray tube of a television receiver.

To accomplish this the present invention embodies a conventional projector using light from an incandescent lamp which is altered by a filter of controlled color and by a screen of controlled color to produce light which, when seen by the patient's eyes, simulate that of the visible emission of the P4 television screen and which will be at intensity level suitable for testing.

The means for accomplishing this is clearly shown in Fig. 1 wherein numeral 11 indicates the outline form of a projector which embodies an incandescent lamp 12, a conventional condensing lens 13, and projection lenses 13a. Means also is provided for supporting a film, slide or similar transparent means 14 having test characters thereon between the condensing and projection lenses whereby an image 14a thereof is projected onto a remote screen 15 to be viewed by a patient's eyes 16. Inserted in the optical system preferably, but not necessarily, adjacent the projection lenses 13a and between the lenses 13a and screen 15, is a filter 17 of controlled spectral characteristics which can be supported in position of use by any known conventional means.

The visible emission 18 of the lamp 12 alone is shown by curve 19 in Fig. 2, indicating a steady consistent increase from about 7% at 400 mu. to about 98% at 700 mu. This indicates considerable contrast to the emission of the P4 screen since it shows high emission of red and low blue and green emission while the P4 is high in the blue and yellow-green and low in the red. Therefore, the light rays going to the screen 15 will normally have an emission curve as indicated by curve 19.

The filter 17 is of a blue-red color and possesses a spectral transmission curve in the visible regions of the spectrum as shown by the curve 20 of Fig. 2. It is apparent from curve 20 that the filter 17 transmits about 88% at 400 mu. but transmission drops to as little as about 20% in the green region (540 mu.) with a slight rise to about 32% in the yellow-green region (560 mu.), dropping again to about 15% in the orange region (620 mu.) and rising sharply in the red region to about 75% at 700 mu.

An example of such a filter is Corning #1-61 as illustrated in "Glass Color Filters," Corning Glass Works, Corning, New York, 1948 issue.

Thus, by using the filter 17 the light rays 18 emitted by the incandescent lamp 12 will be altered as indicated by the curve 22 in Fig. 2.

The resultant curve 22 resembles the curve 10 of the P4 screen up to 600 mu. in that there are definitely established peaks in the blue and yellow-green regions. Above 600 mu. the filter-lamp combination develops a peak in the red which, however, can be effectively eliminated or minimized by providing the screen 15 with a color controlled for absorbing a considerable portion of the red.

Curve 23 in Fig. 3 indicates an ideal color for the screen 15 and is noted as being fairly level throughout the violet, blue and green with a decrease being noted through the yellow and orange and with comparatively little reflectance in the red region.

In accordance with this invention, however, it has been found that by providing the surface of the screen 15 with a pastel blue color, very satisfactory results are obtained. Such a color is indicated by curve 24 in Fig. 3 wherein it will be noted there exists a drop in the orange and red regions. The drop adjacent the 400 mu. line and rise adjacent the 700 mu. line are not believed to be critical because they are substantially out of the sensitivity field of the human eye.

By so coloring the screen 15, the red peak in curve 22 will be pulled down. Thus light 25 when seen by a patient's eyes 16 will have a resultant color as indicated by curve 26 in Fig. 3, which curve is very similar to the P4 curve, that is, there is low transmission in the red, higher transmission in the yellow-green and blue, and a drop in the blue-green similar to the spectral distribution of the P4 television screen and at substantially the same wavelengths at which similar rises and drops occur therein.

Although a tube of the type embodying a P4 phosphor has been set forth throughout the specification by way of illustration, it is to be understood that the same procedure could be followed for cathode ray tubes having other known phosphors.

In view of the fact, however, that the P4 phosphor lies in an intermediate range of the phosphors used in forming the screens of television tubes, corrective glasses produced on the basis of the P4 phosphor would be beneficial in viewing other of such cathode ray tubes.

It is pointed out that light simulating that of a cathode ray tube can be obtained with a white screen by placing suitable superimposed filters directly within the beam of the projected light, but it has been found that the level of transmission with such an arrangement is so low that it is unsuitable for practical testing.

From the foregoing it is apparent that all of the objects and advantages of the invention have been provided wherein the light from the screen of the cathode ray tube of a television receiver has been simulated through use of an incandescent lamp which emits light of a controlled color, a single filter of controlled color for altering the color of the light from the incandescent lamp, and a screen of controlled color for altering the light passing from the filter thereto, and wherein the resultant over-all color and intensity of the light eventually seen by a patient's eyes is practical for testing and prescribing eyeglasses to be worn specifically for viewing television.

It will be apparent, however, that many changes may be made in the details of construction, arrangement of parts shown and described without departing from the spirit of the invention as expressed in the accompanying claims. Therefore, it is to be understood that all matter set forth or shown in the accompanying drawings is to be interpreted as illustrative and not in a limiting sense.

I claim:

1. An eye examining device for use in prescribing lenses for viewing television comprising a colored screen to which the observer's eyes are directed during an examination and projection means including an incandescent lamp and lens means for projecting a beam of light from said lamp to the screen, said light emitted by said lamp having a spectral curve characterized by a minimum transmission at 400 millimicrons which steadily increases throughout the visible spectrum to a maximum transmission at 700 millimicrons, a transparent filter disposed in said beam of light having a maximum transmission near 400 millimicrons and rapidly decreasing to a relatively low transmission area between approximately 520 and 660 millimicrons and thence rapidly increasing, said low area having a small transmission peak adjacent 560 millimicrons, and said screen having a blue color absorbing a relatively large portion of the light above 660 millimicrons in the spectrum whereby the resultant light beam as viewed on the screen when the device is in use will have a spectral curve characterized by relatively high transmission peaks at approximately 480 millimicrons and at approximately 560 millimicrons and having somewhat lower transmission at approximately 540 millimicrons, at 400 millimicrons and between approximately 600 and 700 millimicrons so as to simulate the light from a television tube.

2. An eye examining device for use in prescribing lenses for viewing television comprising a colored screen to which the observer's eyes are directed during an examination and projection means including an incandescent lamp, lens means for projecting a beam of light from said lamp to the screen, and test target holding means disposed to permit an image thereof to be projected by said beam of light onto the colored screen, said light emitted by said lamp having a spectral curve characterized by transmission values which steadily increase throughout the visible region of the spectrum from a minimum transmission value of about 7% at 400 millimicrons to a maximum transmission value of approximately 98% at 700 millimicrons, a transparent filter disposed in said beam of light having a maximum transmission of about 88% at near 400 millimicrons which rapidly decrease in value to about 20% at 540 millimicrons with a slight rise to about 32% at 560 millimicrons, then drops again to about 15% at 620 millimicrons and again rises sharply to about 75% at 700 millimicrons, said screen having a blue color absorbing a relatively large portion of the light above 600 millimicrons in the spectrum whereby the resultant light beam as viewed on the screen when the device is in use will have a spectral curve characterized by relatively high transmission peaks at approximately 480 millimicrons and at approximately 560 millimicrons and having somewhat lower transmission at approximately 540 millimicrons, at 400 millimicrons and between approximately 600 and 700 millimicrons so as to simulate the light from a television tube and permit a measure of the observer's visual deficiencies when viewing a televised image to be obtained.

References Cited in the file of this patent

UNITED STATES PATENTS

| | | |
|---|---|---|
| 1,558,348 | Ferree et al. | Oct. 20, 1925 |
| 1,698,013 | De Zeng | Jan. 8, 1929 |
| 1,828,777 | Leventhal | Oct. 27, 1931 |
| 2,209,728 | Higley | July 30, 1940 |

FOREIGN PATENTS

| | | |
|---|---|---|
| 439,721 | Great Britain | Dec. 12, 1935 |

OTHER REFERENCES

Luckiesch Text "Color and Its Application," 1915, pages 130–137. Publ. by Van Nostrand Co., 25 Park Place, New York City.